United States Patent [19]

Matthews

[11] 4,059,959
[45] Nov. 29, 1977

[54] GEOTHERMAL ENERGY PROCESSING SYSTEM WITH IMPROVED HEAT REJECTION

[75] Inventor: Hugh B. Matthews, Boylston, Mass.
[73] Assignee: Sperry Rand Corporation, New York, N.Y.
[21] Appl. No.: 739,382
[22] Filed: Nov. 5, 1976
[51] Int. Cl.² ............................................. F03G 7/00
[52] U.S. Cl. ....................................... 60/641; 60/690
[58] Field of Search ........................... 60/641, 690, 692

[56] References Cited
U.S. PATENT DOCUMENTS

| | | | |
|---|---|---|---|
| 3,898,020 | 8/1975 | Matthews | 60/641 X |
| 3,951,794 | 4/1976 | Swearingen | 60/641 |

*Primary Examiner*—Allen M. Ostrager
*Attorney, Agent, or Firm*—Howard P. Terry

[57] ABSTRACT

The improved geothermal energy extraction system abstracts thermal energy stored in hot solute-bearing well water to generate a super-heated fluid from an injected flow of a working fluid; the super-heated fluid is then used to operate a turbine-driven pump at the well bottom for pumping the hot geothermal brine in liquid state toward the earth's surface. After energy for the generation of electrical power is extracted from the brine, a consequently cooled portion of the brine is then used at the earth's surface in a combination unitary cooling tower and working organic fluid condensing system. The invention combines the cooling tower and condenser functions in an integrated unit, the outer surfaces of the condenser tubes being exposed to a cascading flow of cooling brine while the brine is itself being cooled. The condenser tubes are arranged geometrically so that a cleaning device may continuously or upon command travel along the condenser tubes, cleaning their outer surfaces of scale accumulations deposited by the depressurized brine.

15 Claims, 5 Drawing Figures

GEOTHERMAL ENERGY PROCESSING SYSTEM WITH IMPROVED HEAT REJECTION

BACKGROUND OF THE INVENTION

1 Field of the Invention

The invention relates generally to efficient means for the generation of electrical or other power by utilizing energy from subterranean geothermal sources and, more particularly, relates to arrangements including efficient super-heated fluid generation, pumping, and control equipment for application in deep, hot water wells for the beneficial transfer of thermal energy at the earth's surface.

2. Description of the Prior Art

Generally related geothermal power generation systems have been particularly discussed in recent United States patents assigned to Sperry Rand Corporation including:

- H. B. Matthews — U.S. Pat. No. 3,824,793 for "Geothermal Energy System and Method," issued July 23, 1974;
- H. B. Matthews — U.S. Pat. No. 3,989,020 for "Geothermal Energy System and Method," issued Aug. 5, 1975;
- R. Govindarajan, J. L. Lobach, K. E. Nichols — U.S. Pat. No. 3,905,196 for "Geothermal Energy Pump Thrust Balance Apparatus," issued Sept. 16, 1975;
- J. L. Lobach — U.S. Pat. No. 3,908,380 for "Geothermal Energy Turbine and Well System," issued Sept. 30, 1975;
- H. B. Matthews — U.S. Pat. No. 3,910,050 for "Geothermal Energy System and Control Apparatus," issued Oct. 7, 1975;
- H. B. Matthews — U.S. Pat. No. 3,938,334 for "Geothermal Energy Control System and Method," issued Feb. 17, 1976;
- H. B. Matthews — U.S. Pat. No. 3,939,659 for "Geothermal Energy System Fluid Filter and Control Apparatus," issued Feb. 24, 1976; and
- K. E. Nichols — U.S. Pat. No. 3,961,866 for "Geothermal Energy System Heat Exchanger and Control Apparatus," issued June 8, 1976.

Systems of the listed patents may be improved by use of the present invention and will be further discussed in the present specification; in general, they comprise geothermal energy recovery systems making use of thermal energy stored by subterranean heat sources in hot, solute-bearing well water to generate super-heated vapor from a surface-injected flow of a clean liquid; the super-heated vapor is then used to operate a turbine-driven pump within the well for pumping the hot brine at high pressure and always in liquid state to the earth's surface, where it transfers its heat in a binary closed-loop, heat-exchanger turbine-alternator combination for generation of electrical power. Residual brine is pumped back into the earth, while the clean, cooled liquid is regenerated at the surface-located system and is returned to the deep well pumping system for generating vapor and also may be used for lubrication of fluid bearings supporting the turbine-driven pump system. The patents also illustrate improvement features in the form of hydrodynamic radial and thrust bearings and pressurized liquid bearing lubrication means. A reverse flow, deep well vapor turbine motor of compact nature is also disclosed, along with features of surface control and power generation systems.

More recently, H. B. Matthews introduced a new type of geothermal energy extraction concept is his patent application Ser. No. 674,243, filed Apr. 6, 1976 for a "Geothermal Energy Conversion System" in which the present invention may also be advantageously employed. In the latter Sperry Rand Corporation application, Matthews describes a gravity head geothermal energy recovery system for improved efficiency again making use of thermal energy stored in hot, solute-bearing well water as it is pumped upward to the earth's surface but now through an extended heat exchange element for continuously heating a downward flowing organic fluid to a supercritical state. Some of the energy of the latter fluid to a supercritical state. Some of the energy of pump for pumping the hot, solute-bearing well water at high pressure and in liquid state to the earth'surface, where it is reinjected into the earth in another well. The temperature difference between the upward flowing brine and the downward flowing organic working fluid is maintained finite in a predetermined manner along the subterranean extended heat exchange element. After driving the deep-well turbine-driven pump, the organic fluid arises to the earth's surface in a thermally insulated conduit; at the earth's surface, vapor turbine electrical power generation equipment is driven by the ascending organic fluid, after which it is returned into the well for re-heating in the extended heat exchanger. The use of an organic working fluid in the gravity head well system achieves efficient low-temperature operation in wells wherein the brine reaches only moderate temperature and this operation is further improved according to the present invention.

SUMMARY OF THE INVENTION

The present invention is an improved geothermal energy extraction system that recovers thermal energy stored in hot solute-bearing well water to generate a super-heated fluid from an injected flow or working fluid. The super-heated fluid is used to drive a turbine-driven pump near the geothermal well bottom for pumping the hot brine, always in liquid state, toward the earth's surface. After energy for the generation of electrical power is extracted from the flowing brine, a cooled portion of the brine is employed at a surface station in a unitary condenser-cooling tower combination for condensing the organic fluid. The cooled portion of the brine is cascaded as a droplet shower over the condenser tubes, being itself cooled as it falls. The outer surfaces of the condenser tubes, being exposed to precipitation of solute materials found in the brine, are disposed so that a cleaning device may travel along those surfaces, removing any scale accumulations so that the efficiency of the operation is maintained at an economical level.

DESCRIPTION OF THE PREFERRED EMBODIMENTS

Figure 1:
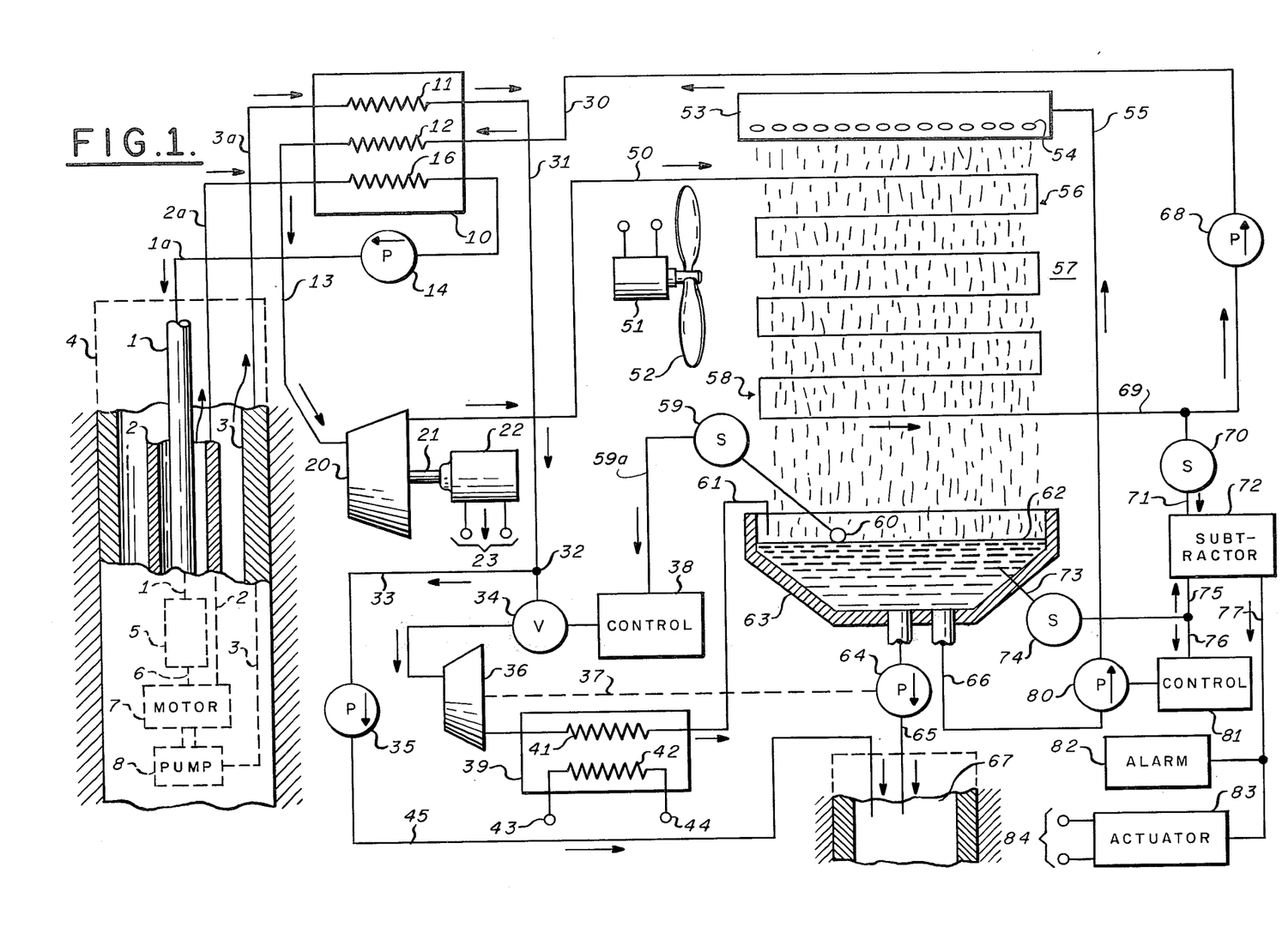
FIG. 1 is an elevation view, partly in cross-section, of the deep well geothermal energy conversion system and of cooperating surface-located control and power generation apparatus.

FIG. 1 illustrates one embodiment of the novel geothermal energy extraction system as being composed of three major sub-systems. The first or geothermal well sub-system extends from its well head 4 located adjacent the earth's surface for a distance far below that surface into an effective cavity or region where a copious supply of extremely hot water or brine under high pressure is naturally available. An active turbine motor 7 and a brine pump 8 are located adjacent the hot water reservoir within a conventional well casing pipe 3 for operation in the manner generally described in the aforementioned Matthews U.S. Pat. No. 3,824,793 and 3,910,050 and elsewhere. In such prior systems, a working fluid is turned to vapor in a vapor generator 5 heated by the flow of hot brine past it in well casing 3. The vapor passes through pipe 6 to drive a turbine motor 7 which thereby drives the brine pump 8. The exhausted vapor flows from turbine motor 7 via pipe 2 to the earth's surface, there to be condensed and returned in liquid form via pipe 1 to steam generator 5. While the apparatus of the present invention is illustrated in operation with a particular type of geothermal well pumping arrangement, it will be understood that it is equally useful with other kinds of energy extraction systems, including that of the aforementioned H. B. Matthews U.S. patent application Ser. No. 674,243. It will be apparent that the system of the Matthews U.S. Pat. No. 3,824,793, for example, may convey significant amounts of energy to the surface energy conversion means including heat exchanger 10 both through the exhaust vapor in pipe 2a and the brine flowing in the well casing extension 3a, the relative proportions being a matter of design choice. For example, the system of the Matthews U.S. Pat. No. 3,824,793 transfers much of its thermal energy to surface power conversion apparatus using the brine medium. On the other hand, in the Matthews application Ser. No. 674,243, the extended down-well heat exchanger transfers the major part of the heat in the upward flowing brine into the descending supercritical fluid, the brine being normally returned at the earth's surface directly into a reinjection well. A second sub-system of the present invention in the form of a brine reinjection well 67 also extends from a location at the earth's surface into deep earth strata which may be horizontally spaced from the aforementioned hot brine source.

Apparatus at the earth's surface forms a third sub-system and cooperates with the geothermal and reinjection well system according to the present invention, as is illustrated in FIG. 1. It will be understood that an objective of the invention is to generate large quantities of electrical power at terminals 23 at the earth's surface using a conventional fluid turbine 20 driving the electrical power generator 22, both preferably located at ground level. For this purpose, hot brine is pumped to the earth's surface by the geothermal well pump 8, being fed by casing 3 and its extension 3a to element 11 of a conventional boiler-heat exchanger device 10. Apparatus 10 is a conventional closed tank-like device designed to exchange heat between conventional heat exchanger elements 11 and 12 located therein. Elements 11 and 12 may take the forms of lineal or coiled pipes exchanging thermal energy by direct thermal conduction through their metal walls or through a suitable fluid disposed in the well known manner about them. The well pump 8 forces the hot brine upward through the annular region between well casing 3 and pipe 2 and pipe 3a and its thermal content is a significant source of heat for supply to the input element 11 of device 10. As in the aforementioned Matthews U.S. Pat. No. 3,910,050, the brine passing through element 11 also passes through pipes 31 and 33 after having been dropped in temperature within heat exchanger 10 and is then fed through pump 35, if needed, and pipes 45 into reinjection well 67. Thus, the dissolved mineral salts pumped to the surface in the hot brine in pipes 3 and 3a are returned harmlessly into the ground.

As is described in the aforementioned Matthews U.S. Pat. No. 3,910,050, other sources of geothermal energy may also be employed to add thermal energy to heat exchanger 10, such as the working fluid exhausted by pipe 2a from the deep well turbine 7 and flowing upward in the annulus between pipes 1 and 2. This exhaust fluid may be allowed to flow through pipe 2a into a heat exchanger element 16 also located within device 10 for forced flow by pump 14 after cooling or condensation, through pipes 1a and 1 back into the deep well heat exchanger or vapor generator 5 associated with well turbine 7, as described in the Matthew's U.S. Pat. No. 3,910,050. The exhaust working fluid is thus used beneficially in this way to increase the operating efficiency of the present invention.

In any event, the condensed working fluid may be returned, for example, for re-use in the deep well apparatus, as is indicated in FIG. 1. The exhaust working vapor in pipe 2a passes through an input element 16 of heat exchanger 10. The condensed working fluid passes from element 16 through pump 14 into pipe 1a for re-use within geothermal well turbine 7. The working fluid may be pure water or another similar material. Liquid and vapor phases may be employed in the cycle or solely a supercritical liquid phase may be employed, as taught in the aforementioned Matthews patent application Ser. No. 674,243.

The major elements for supply of heat into boiler-heat exchanger device 10 have been described. This heat is removed and used in a substantially conventional manner to operate the surface-located main fluid turbine 20. For this purpose, fluid which may be in the form of a halocarbon organic material is supplied by feed pump 68 via pipe 30 to the heat exchanger element 12 of heat exchanger element 12 of heat exchanger device 10. Flow of the liquid in element 12 is counter to the direction of flow of heat in elements 11 and 16. The liquid in element 12 may thus evaporate, consequently generating high temperature, highly energetic vapor coupled via pipe 13 into the input stage of multi-stage power turbine 20. After performing useful work therein by driving shaft 21 and generator 22, the power turbine exhaust is fed by pipe 50 into a novel condensing system 57 with an initial loop 56. The condensed organic fluid exits at the final loop 58 of system 57 and is pumped through pipe 69 by pump 68 into pipe 30, pipe 30 providing the input coupling to heat exchanger element 12. In this manner, the fluid for driving the main power turbine 20 is continuously re-cycled.

It will be understood that the apparatus, as thus far described, consists in one form of a deeply submerged super-heated steam generator 5 for driving a turbine 7 which, in turn, drives a hot brine pump 8. Clean water, formed by condensing clean steam in condenser 15, is supplied to be converted within vapor generator 5 into highly energetic steam for driving the geothermal well turbine 7. The brine pump 8 serves to increase the pressure level of the hot brine so that it reaches the surface-located heat exchanger 10 at the earth's surface still well above its saturation pressure and so that it may never, by flashing into steam, produce undesirable mineral deposition.

According to the invention, a lower cost is achieved for the geothermal power extraction system and the efficiency of the apparatus for condensing the organic exhaust fluid from the main power turbine 20 is significantly increased. The invention achieves this desirable result by combining in a novel manner the functions of a cooling tower and fluid condenser system and furnishes a means for using a portion of the usually highly contaminated geothermal brine as the condenser coolant fluid. At the same time, it permits control over fouling and scaling of heat transfer surfaces by salts precipitating from the geothermal brine itself. Thus, the availability of copious clean cooling water sources (lakes, rivers, et cetera) in the near vicinity of the geothermal power plant is no longer a significant problem. The invention thus permits conservation of water on the one hand and, on the other hand, overcomes the problems of the usual situation in which copious supplies of clean cooling water are not at all available in the vicinity of the geothermal well site. The cooling water may even by augmented by using highly contaminated water such as the saline water of the Salton Sea.

As previously noted, the novel system of FIG. 1 returns the brine after its passage through the primary heat exchanger element 11 via pipes 31, 33, and 45 to the reinjection well 67. A second portion of the cooled brine in pipe 31 branches at the junction 32 and, as determined by the setting of valve 34, passes through pipe 61 into the wet well or sump 63 of the combination condensing system 57. If desired, some energy remaining in the cooled brine may be salvaged at this point. For example, power to drive the second reinjection well pump 64 may be supplied by arranging that the brine passing through valve 34 into wet well 63 drive an auxilliary turbine 36 provided with a mechanical shaft 37 or other power transfer link for operating the second reinjection pump 64. The purpose of pump 64 is to pump brine from wet well 63 through pipe 65 into reinjection well 67. In any case, it may be desirable to precool the brine in pipe 61 after passage through turbine 36, as by passing it through a condensing element 41 of a condenser 39. Condenser 39 may be cooled in a conventional manner, as by including a second heat exchanger element 42 therein, joined at couplings 43 and 44 to a piping loop system circulating coolant, for example, through a conventional cooling tower (not shown). The flow of cooled brine through pipe 61 into wet well 63 may be continuously or manually controlled, or preferably will be monitored by the liquid-level ball-float sensor 59, 60, as will be explained.

For cooling the coils such as coils 56, 58 of the condensing system 57, brine from the wet well 63 is pumped by pump 80 through pipe 66 into pipe 55 upward to a distribution manifold 53 at the top of the condensing array of pipes. Thus, there is a large volume flow of cooled brine from wet tank 63 that is emitted into the atmosphere by a suitable array or arrays of orifices, such as orifice 54, in the lower surface of manifold 53 so as to fall downward over the condenser array 57, cooling the exhaust organic fluid flowing within it. The cascade of brine droplets is collected by wet well 63 and the level 62 of brine in wet well 63 is also determined, in part, by the flow of additional brine provided by valve 34 and in pipe 61. It is seen that the falling brine, which may readily be broken up into droplets by a conventional arrangement of fill (not shown) is cooled by evaporation from the droplet surfacs. Such evaporative cooling may be enhanced by moving air through the droplet shower as generally indicated by the fan 52 driven by motor 51 so that a substantial volume of rapidly moving air passes through the shower. In turn, the droplets cool the pipes of array 57 and the organic vapor flowing within the array, condensing it.

The fan 52 may be arranged with appropriate ducting, for example, so that a major part of the moving air flows parallel to and opposite the direction of flow of the droplet shower. In general, the fan 52 and motor 51 may be provided with a conventional casing and may be supported by conventional supports (not shown) as will the other elements of the condensing system 57 be supported in fixed relation by means well known to those skilled in the art. A plurality of centrifugal blowers may be employed. It will further be recognized that the condensing system may employ a plurality of condensing elements 57 forming a parallel-fed rectangular tridimensional serpentine array, with a plurality of distribution manifolds 53 above each element of the array, all parts cooperating with a wet well extending therebelow at right angles to the plane of FIG. 1. Other known types of condenser configurations, including the helical array illustrated in FIG. 4, may equally well be employed in the invention.

According to the invention, it is desired that the wet well 63 be maintained filled with brine at a substantially constant predetermined level 62. Flow of brine solution into it and especially out of it is designed to flush any accumulation of solid material precipitated from the brine solution in tank 63 through pump 64 into reinsertion well 67. Accordingly, there is provided a conventional liquid level sensor 59 having, for example, a ball float 60 residing on the brine surface 62. Sensor 59 may be of the type supplying an electrical output signal proportional to the brine liquid level via electrical lead 59a to a conventional valve controller 38. Controller 38 may be a conventional device which yields a command signal related to the error in the liquid level from a desired reference value. Conventional on-off control of the position of valve 34 is also readily effected. It will be observed that the second reinjection pump 64 is operated generally at the same time that brine is being supplied to the wet well 63 under command of controller 38; evidently, the rate of flow in pipe 61 is designed to be greater than that through reinjection pipe 65 so that the desired design liquid level 62 is ultimately reached and valve 34 is then automatically closed.

According to the invention, the rate of pumping brine from wet well 63 by pump 80 into the distribution manifold 53 is controlled according to the ambient temperature so that the content of wet well 63 does not freeze in extreme weather. For example, as the ambient temperature approaches the freezing level, the rate of flow induced by pump 80 is accordingly decreased. The desired control is accomplished by a conventional controller 81 responsive to a conventional sensor 74 having a suitable probe 73 for sensing the temperature of the brine in wet well 63. The temperature sensor 74 may be selected from conventional devices adapted to yield an electrical output signal on lead 76 substantially proportional to the brine temperature. The signal on lead 76 is used to operate a conventional controller 81 which determines the rate of operation of an electrical motor integral within pump 80. The rate of brine flow through pump 80 is generally maintained constant, but the controller 81 causes speed reduction to occur at a predetermined temperature somewhat above the freezing temperature of the brine in wet tank 63. A simple thermal relay may thus be used to reduce the speed of pump 80 from its normal fixed rate to a second but reduced rate, the reduction occurring at and below the predetermined temperature. The reduced brine flow in the cascade from distributor manifold 53 automatically permits the brine to be additionally heated during its descent to wet sink 63, so that the temperature of the brine therein rises to a safe level above freezing. Controller 81 may also operate a visual or audible alarm, if desired.

The efficiency of the novel geothermal energy extraction system may be undesirably diminished by the accumulation of scale, films, or other deposits that may precipitate from the cooling brine onto the exterior surfaces of the condenser pipes in array 57, because heat flow from the organic fluid into the droplet shower is evidently decreased by the presence of such relatively thermally insulating solid layers. According to the invention, the build-up of such solid layers to significant depth is detected by noting any increase in a parameter proportional to the temperature or to the pressure of the organic vapor at the output end of condensing loop 58 with respect to the temperature of the brine in wet well 63. Thus, according to the invention, a conventional temperature sensor 70 coupled to the interior of condensing loop 58 may supply an electrical control signal via lead 71 proportional to that temperature to a conventional comparator or analog subtraction circuit 72. A pressure sensor may evidently be substituted for temperature sensor 70. It will, of course, be understood that these and any of the other sensors provided according to the invention may be equipped with suitable displays allowing visual observation of the respective functions measured by the individual sensors. Since subtractor 72 also receives, on electrical lead 75, the output of the aforementioned temperature sensor 74, the output of subtractor 72 on electrical lead 77 is proportional to the difference between the temperatures of the cooled organic vapor and the brine in the wet well 63. If the temperature of the organic fluid flowing in the output loop 58 is too high with respect to the brine temperature, the indication is that the cooling is not as effective as desired for efficient condenser action, and this elevated signal may then be passed by electrical lead 77, for example, to operate a visual or audible alarm 82. It will be understood that the alarm may be of a conventional type having a threshold limit only above which alarm operation actually occurs. The signal on lead 77 may alternatively or additionally be used to operate a control or actuator 83 whose output leads 84 are connected to apparatus for causing removal of the undesired scale or other solid residue from the outer surfaces of the pipes of condenser assembly 57.

Figure 2:
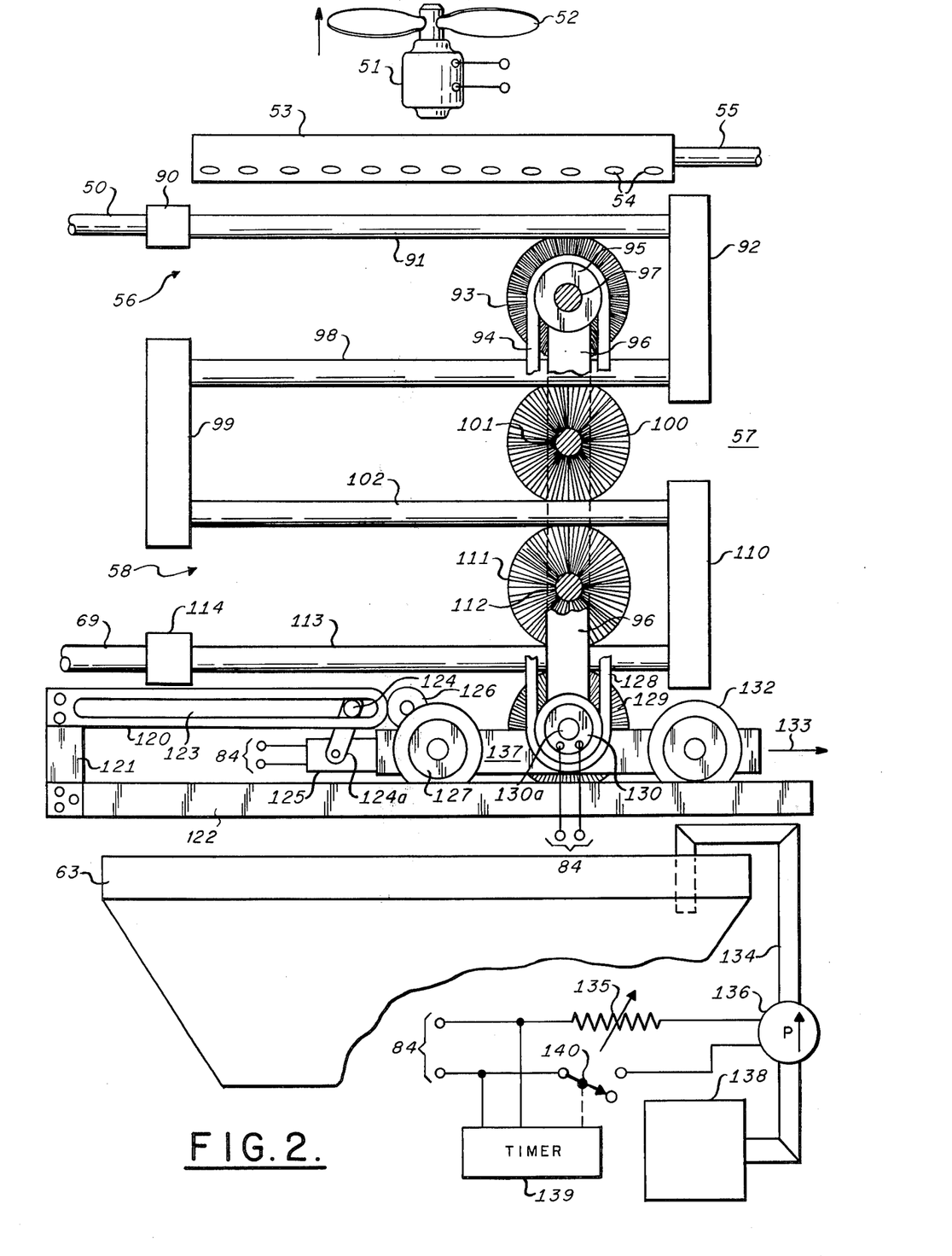
FIG. 2 is an elevation view, partly cut away, of one form of cleaning apparatus for use in the apparatus of FIG. 1.
Figure 3:
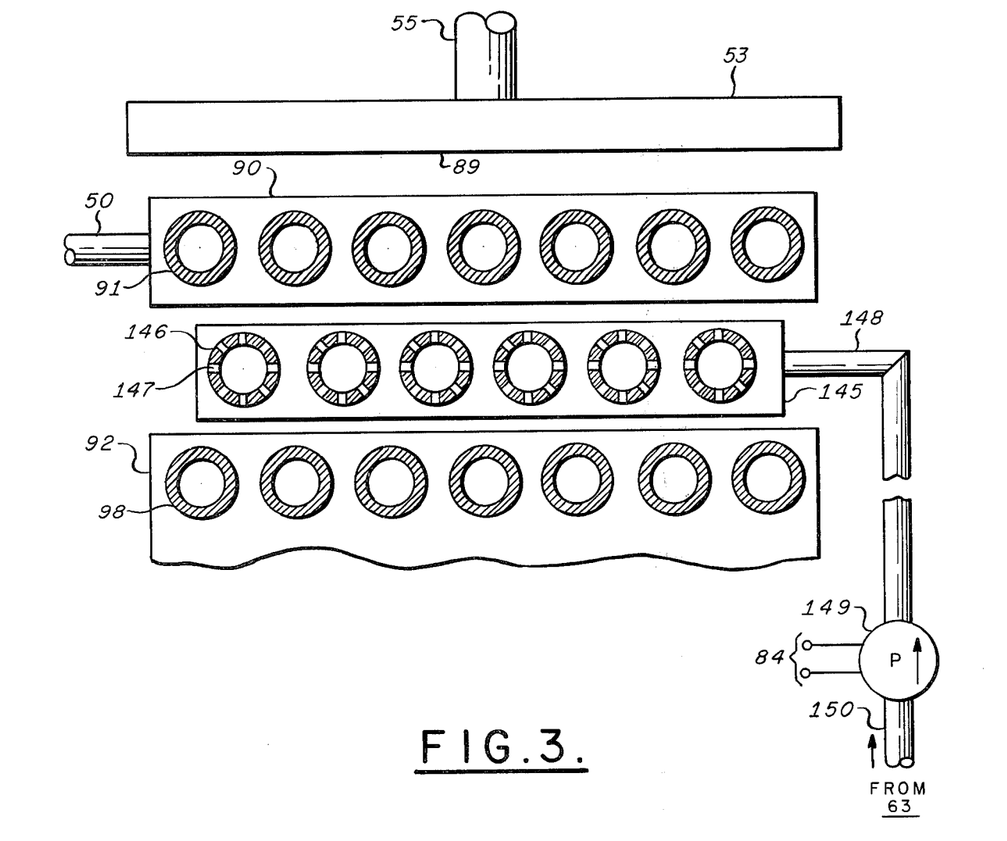
FIG. 3 is an elevation view of a second form of the cleaning apparatus.
Figure 4:
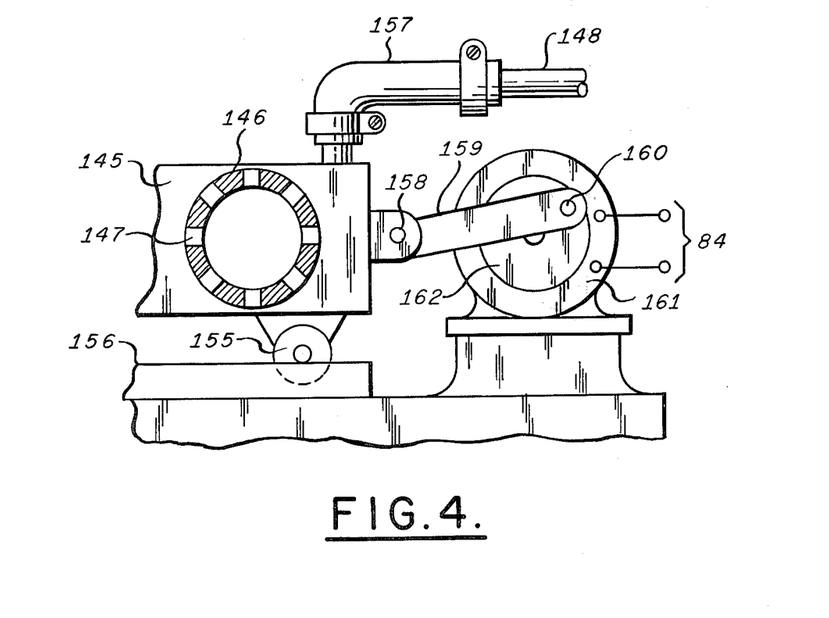
FIG. 4 is an elevation view of an alternative portion of the FIG. 3 arrangement.
Figure 5:
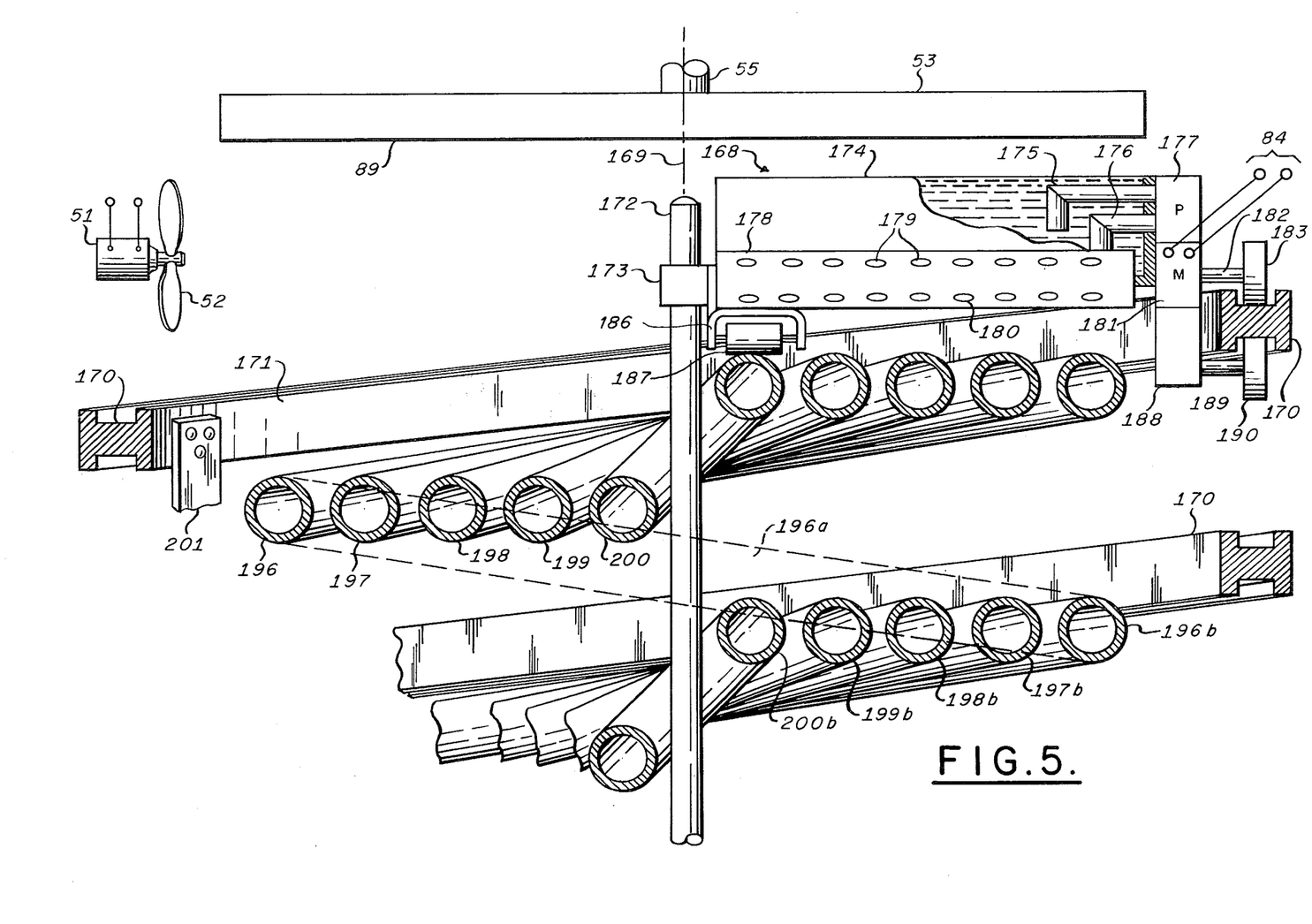
FIG. 5 is an elevation view in partial cross section of an alternative embodiment of the cleaning apparatus of FIGS. 2 and 3.

Further, according to the invention, scale or other undesired solid material may be removed from the pipes of condenser assembly 57 by several methods, particularly by energetic brushing of the surfaces, as in FIG. 2, or by the impact of a high pressure liquid spray, as in FIGS. 3, 4, and 5. In the particular form shown in FIG. 2, a mobile assembly of rotating brushes on carriage 137 may be continuously operated for the purpose. As in FIG. 1, a parallel array of serpentine condensing pipe systems 57 is employed in FIG. 2, fed via input pipe 50 with exhaust vapor from the main power turbine 20, and supplying condensed fluid via output pipe 69 and pump 68 to heat exchanger element 12. Other elements also used in FIG. 1 appear in FIG. 2 and bear corresponding reference materials, including the brine distribution manifold 53, motor 51 and its associated fan 52, and the wet tank 63; appropriate controls such as discussed in connection with FIG. 1 may also be employed in the system of FIG. 2. Conventional manifolds 90, 92, 99, 110, and 114 cooperate in the usual manner with corresponding arrays of the condenser pipes, such as shown at 91, 98, 102, and 113. The fan 52, distribution manifold 53, condenser array 57, and the wet well 63, as well as a pair of rails 122 or tracks along which the brush carriage 137 is translated, are supported by a conventional framework, not shown in the drawing since its nature will be evident to those skilled in the art and for the sake of affording a clear illustration of the invention.

As has been discussed, the condenser array 57 may consist of large pluralities of coolant pipes lying in the respective horizontal planes in which coolant pipes 91, 98, 102, and 113 are disposed. Each plane, such as the plane of pipes 98, is served, for example, by two opposed cylindrical rotary brushes, such as brushes 93 and 100; the brushes may fully envelope pipes 98 as the brushes are spun about their respective shafts 97, 101. Such a rotary brush may also be disposed between the brine distribution manifold 53 and the pipes 91.

The several rotary brushes 93, 100, 111, 129 spin on respective parallel shafts 97, 101, 112, 130a that are journalled in upright frame elements 96 at each end of the several shafts. Upright frames 96 are adapted to move back and forth, being mounted on the horizontally translatable carriage 137 whose pairs of flanged wheels 127, 132 respectively engage pairs of rails 122 and are driven by motor 126 in a conventional manner. Wheels 127, 132 may alternatively take the form of flanged gears with a toothed circular surface cooperating with the teeth of pairs of racks substituted for rails 122. Motor 126 may also be used to drive brushes 93, 100, 111, 129 through suitable belts, shafts, or gearing.

In FIG. 2, a separate motor 130 mounted on the upright 96 of carriage 137 is used to drive the several brushes. Motor 130 drives brush 129 directly, its rotor being coupled mechanically to the shaft 130a of brush 129; motor 130 is equipped with a pulley whereby its associated V-belt 128 drives rotary brush 111. Pairs of pulleys and V-belts cooperate to drive each successive brush shaft until a final V-belt 94 drives the single pulley 95 associated with rotary brush 93, for example. It will be apparent to those skilled in the art that other known drive mechanisms may be substituted for spinning the brushes 93, 100, 111, and 129 or that individual motors may be used on each shaft. Motor 130 may be driven constantly or may be turned on or off at the will of the operator. Alternatively, operation of motor 130 and consequently of brushes 93, 100, 111, and 129 may be made automatic by use of the aforementioned electrical actuation signal provided on leads 84 of the FIG. 1 apparatus.

The same electrical signal from terminals 84 of FIG. 1 may be used to cause back and forth translation of carriage 137 by proper operation of motor 126 which drives the flanged carriage wheel 127. As shown in figure, carriage 137 has nearly reached the limit of its rightward travel (arrow 133), at which point the slot 123 in the horizontal slotted member 120, fixed relative to rails 122 as by support 121, will stop the motion of pin 124, moving arm 124a of reversing switch 125 to the left so as to reverse the operation of motor 126 and consequently the direction of translation of carriage 137. When carriage 137 reaches its leftward extreme position, pin 124 impacts the opposite end of slot 123, again reversing travel of carriage 137. The cycling continues as long as there is a command signal on terminals 84.

If desired, the cleaning efficiency of the rotary brush system may be enhanced by adding a non-foaming detergent to the brine solution in wet well 63. For this purpose, the invention provides a reservoir 138 of liquid detergent which is pumped by pump 136 via pipe 134 into the wet tank 63 on command. Pump 136 may be operated at a speed determined by a control such as manually adjustable variable resistor 135 as long as the signal on terminals 84 of FIG. 1 is present. On the other hand, it may be preferred to operate pump 136 at full pumping speed for a short time as soon as the electrical command signal on terminals 84 is present. Such may be accomplished by having the command signal operate a timer 139 arranged to close switch 140 at once and to open it at a predetermined later time when the concentration of detergent in wet tank 63 is adequate. Switch 139 may also be manually operated.

If desired, the rotary brush system may be moved entirely from the condensing unit 57 by supporting the brush shafts from one end only and by arranging that their support system be translated at right angles to the plane of the drawing of FIG. 2. Further, it will be understood that carriage 137 may readily be operated from overhead rails supported, for example, above the brine distribution manifold 53. It will be additionally understood that actuator 83 may be made to operate motor 130 or, more particularly, the cleaning brushes themselves at a rate generally proportional to the measured thickness of the undesired scale deposit.

A preferred embodiment of the condenser pipe cleaning apparatus is illustrated in FIG. 3, wherein high pressure liquid spray is directed against the surface to be cleared of brine-deposits, the spray consisting of the brine solution taken from wet tank 63 with detergent added as previously discussed. While this configuration is illustrated in lieu of the rotating brush system, it will be understood that brushes and a high pressure spray mechanism may be used cooperatively.

The illustration in FIG. 3 is somewhat analogous to a view taken at right angles to FIG. 2 with the brush mechanism removed, so that the condenser pipes 91 are now seen in section, each joined to the manifold 90 that is fed by the turbineexhaust pipe 50. Also shown in the fragmentary view is a cross-section of the next lower array of condenser pipes 98, each joined to the next lower manifold 92. In the figure, it is indicated that each adjacent pair of condenser pipe assemblies, such as those of the respective condenser pipes 91 and 98, are spaced apart to accommodate a high pressure jet spray cleaning device. Brine from wet tank 63 containing detergent, if desired, is pumped through pipes 150 and 148 by high pressure pump 149 into the distribution manifold 145. Pump 149 is driven by an integral motor which may be excited by the signal on terminals 84 of FIG. 1. Each pipe 146 is provided along its length and about its circumference with a multitude of high pressure orifices, such as orifice 147, so that high pressure needle-like fluid jets are directed in many different directions toward the outer surfaces of condenser pipes such as pipes 91 and 98. The sharp, high pressure spray, aided by the dissolved detergent material, readily removes the accumulated layer of brine solute.

The action of the spray may be enhanced by supplying a motor and an appropriate drive mechanism for spinning each of the several pipes 146 each about their individual axes. A similar effect is produced by pulsing the pressure supplied by pump 149 by any convenient means. A further alternative mechanism is illustrated in FIG. 4, where the manifold 146, fed from pipe 148 through flexible hose or pipe 157, is provided with plural roller drums 155 riding in a pair of U-shaped channels 156. A motor 161 drives a disk 162 having an eccentric pin 160 and a connecting rod 159 linked from pin 160 to manifold 145 through pin 158. Rotation of motor 161 causes oscillatory or dithered translation of the spray-generating assembly so that all parts of the surface to be cleaned are exposed to the high pressure cleaning spray for loosening and removing undesired scales. Channels 156 and motor 161 are supported by the framework supporting the condenser pipe system and the distribution manifold 53, which latter may have a lower face 89 with a multiplicity of orifices for forming the droplet shower previously discussed. It will be apparent that cleaning arrays such as that including pipes 146 may readily be translated, when not in use, out of the apparatus by using a suitably supported trolley system or that they may be operated continuously within the condenser array.

A further preferred form of the invention for particular applications in which high pressure liquid cleaning jets are desired is illustrated in FIG. 5. This form of the invention is of particular interest for use in a condenser system having a vertical axis 169 in which the condenser pipes to be cooled by brine droplets from the brine distribution manifold 53 take the form of an assembly of nested, generally coaxial, helical condenser pipes, one half turn of which assembly is shown in section as including helical half-turn segments 196, 197, 198, 199, 200. It will be understood that these helical pipes extend continuously from the top to the bottom of the condenser volume, being fed by an input manifold like manifold 90 of FIG. 2 and exhausting into a manifold 114 such as is also seen in FIG. 2. The continuity of the coils is indicated by the half turns (sectioned) 196b, 197b, 198b, 199b, and 200b and further by way of example by the dotted connection 196 between half turns 196 and 196b.

In the embodiment of FIG. 5, use is not made of a carriage which is simply translated along a straight path, but there is used a carriage 168 which follows a helical path up and down the condenser assembly. In effect, the path is generated by continuously rotating the radially disposed carriage 168 while continuously lowering (or raising) the intersection of the associated radius with respect to axis 169. The double track 171 has an H-shaped cross section 170 and it also forms a helix with respect to axis 169, lying outside of the volume occupied by the condenser pipe assembly and supported in a conventional manner by a suitable framework indicated at 201. Wheel or gear 182 on shaft 182 is driven reversibly by motor 181 mounted on the frame 188 of the carriage 168; the second guide wheel 190 on shaft 189 is also journaled in frame 188 and may be an idler wheel. Wheels 183 and 190 cooperate with the opposed tracks in helical guide 171 is supporting one end of the carriage 168, as well as enabling that end to be driven along track 171. The inner end of frame 188 may be supported with respect to an inner condenser helix 200 by an idler drum 187; drum or roller 187 is journaled in yoke 186 affixed to the inner end of frame 188, the drum 187 engaging at least one of the condenser pipes, such as pipe 200. If desired, drum 187 may be positively driven by a motor such as motor 181. Means for reversing the carriage 168 at each end of its helical path may be supplied in a conventional manner, such as in the general manner illustrated in FIG. 2. The inner end of the radially disposed frame 188 may be coupled to a yoke 173 loosely fitting around the vertical rod or pipe 172 lying on axis 169; yoke 173 acts as a further guidance aid.

The function of the carriage 168 and of its frame 188 is to support means for directing highly energetic jets of brine usually containing non-foaming detergent material at the outer surfaces of condenser coils 196 through 200 for removal of undesired scale deposits. For this purpose, the carriage 168 includes a distributor manifold 178 for directing such jets through orifices 180 toward such surfaces below manifold 178 and also through orifices 179 directed upwardly toward other surfaces similarly to be cleaned of scale or brine deposits. Thus, while traversing its spiral path, the carriage 168 and its liquid jets simultaneously clean contiguous condenser pipe surfaces above and below manifold 178, the manifold 178 being disposed in front of tank 174.

Liquid for performing the cleaning function is collected in the open tank 174 as it showers down in the form of droplets from the distribution manifold 53. The liquid level in tank 174 may be augmented at a particular point in the trajectory of carriage 168, as at its bottom reversal point, and detergent material may be automatically or manually added there to reservoir 174. Motor 181, which drives wheel 183, may be used through suitable step up gearing to drive a high pressure pump 177; when operating, pump 177 takes liquid out of tank 176 into the jet manifold 178 for cleaning the condenser pipe assembly. It will be understood that the water jets may contain, in addition to or alternaive to a detergent material certain well known soft blast media to aid the cleaning function.

Accordingly, it is seen that the invention overcomes a problem which has been faced at some considerable expense at certain geothermal energy sites. By way of example, a one thousand gallon per minute geothermal well would require the evaporation of substantially 200 gallons per minute of water into the atmosphere to cool the organic fluid condenser and an additional 100 to 200 gallons per minute to pass through the cooling tower in unevaporated state for controlling the build-up of solid precipitates and solutes in the wet well of the cooling tower. According to the invention, a portion of the well brine successfully performs this function after the brine heat has been usefully extracted in the electrical power generation process. According to the invention, the functions of the cooling tower and organic fluid condensing system are combined in an integrated unit. The effective combination of the cooling tower and organic fluid condenser systems permits operation with a smaller difference between the wet bulb and condensing temperatures because the cooling water shower is itself continuously cooled as it cascades over the condenser pipes. The condenser pipes over which the cooling brine cascades are arranged geometrically so that a cleaning device may continuously or upon command travel along the condenser pipes, cleaning their exterior surfaces of the inevitable scaling caused by the precipitation of carbonates, silica, and other solutes from the unpressurized brine. Thus, the combined system furnishes a means for using a portion of the contaminated geothermal brine as the organic fluid condenser coolant and, at the same time, for controlling the fouling and scaling of the heat transfer surfaces contacted by the brine.

While the invention has been described in its preferred embodiments, it is to be understood that the words which have been used are words of description rather than of limitation and that changes within the purview of the appended claims may be made without departure from the true scope and spirit of the invention in its broader aspects.

I claim:

1. Geothermal deep well energy extraction apparatus of the kind in which solute-bearing water is pumped to a station at the earth's surface utilizing thermal energy extracted within said well from said solute-bearing water for operating turbine-motor driven electrical generator means at said station, a major portion of said solute-bearing water being returned from said station into reinjection well means, said extraction apparatus further including:
   coupling means for supplying a working fluid utilizing a portion of said extracted thermal energy to an input of said turbine motor means,
   condenser conduit means coupled to the output of said turbine motor means for condensing said working fluid and returning said condensed working fluid to said coupling means,
   manifold distributor means for enveloping said condenser conduit means in a coolant shower in droplet form,
   wet well tank means for collecting said coolant shower after cooling said condenser conduit means,
   air circulating means for cooling said droplets of said coolant shower while descending from said manifold distributor means to said wet well tank means,
   first pump means for conveying coolant from said wet well tank means to said manifold distributor means, and
   control means for selecting a minor portion of said solute-bearing water before said major portion is returned to said reinjection well means for maintaining a predetermined liquid level within said wet tank means.

2. Apparatus as described in claim 1 wherein said control means comprises:
   liquid level sensor means for sensing the level of said coolant in said wet well tank,
   first conduit means for returning said major portion of said solute-bearing water into said reinjection well means,
   second conduit means branching from said first conduit means for supplying said minor portion of said solute-bearing water to said wet well tank means, and
   valve means in said second conduit means responsive to said liquid level sensor means.

3. Apparatus as described in claim 2 further including:
   second pump means at the bottom of said wet well tank means for pumping solute-bearing water and particulate matter from said wet well tank means into said reinjection well means, and fluid motor means responsive to flow of solute-bearing water in said second conduit means for driving said second pump means.

4. Apparatus as described in claim 1 further including:
temperature sensor means for sensing the temperature of said coolant within said wet well tank means, and
controller means responsive to said temperature sensor means for controlling the rate of operation of said first pump means.

5. Apparatus as described in claim 1 further including:
means for sensing a function of the temperature of said condensed working fluid at the output of said condenser conduit means for forming a first control signal,
temperature sensor means for sensing the temperature of said coolant within said wet well tank means for forming a second control signal,
subtractor means responsive to said first and second control signals for forming a difference signal, and
utilization means responsive to said difference signal.

6. Apparatus as described in claim 5 wherein said utilization means comprises alarm means for indicating the presence of a predetermined thickness of solute-deposit on said condenser conduit means.

7. Apparatus as described in claim 5 wherein said utilization means comprises means for removing solute deposits from the outer surface of said condenser conduit means.

8. Apparatus as described in claim 1 additionally including means for removing solute deposits from the outer surface of said condenser conduit means in the presence of said coolant shower.

9. Apparatus as described in claim 8 wherein said means for removing solute deposits comprises:
rotary brush means contacting while rotating at least a portion of said outer surface of said condenser means,
first motive means for rotating said rotary brush means, and
second motive means for translating said rotary brush means along said condenser conduit means.

10. Apparatus as described in claim 8 additionally including means for adding a non-foaming detergent to said wet well tank means during operation of said means for removing said solute deposits.

11. Apparatus as described in claim 9 including means for cyclically reversing the direction of translation of said second motive means.

12. Apparatus as described in claim 1 additionally including means for removing solute deposits from the outer surfaces of said condenser conduit means comprising:
high pressure spray means for impacting at least a portion of the outer surface of said condenser conduit means with energetic liquid jets, and
pressure pump means for supplying said high pressure spray means with coolant from said wet well tank.

13. Apparatus as described in claim 12 further including means for oscillatory translation of said high pressure spray means in a plane such as to insure effective impact of a major portion of the outer surface of said condenser conduit means with said energetic liquid jets.

14. Apparatus as described in claim 1 additionally including means for removing solute deposits from the outer surface of said condenser conduit means comprising:
carriage means,
high pressure spray means disposed on said carriage means for impacting at least a portion of the outer surface of said condenser conduit means with energetic liquid jets,
collector tank means additionally disposed on said carriage means for collecting a portion of said coolant shower from said manifold distributor means, and
second pump means additionally disposed on said tank means for conveying coolant from said collector tank means to said high pressure spray means.

15. Apparatus as described in claim 14 further including means for translating said carriage means along said condenser conduit means.

* * * * *